United States Patent [19]

Petro et al.

[11] Patent Number: 4,627,789

[45] Date of Patent: Dec. 9, 1986

[54] APPARATUS METHOD FOR CALIBRATING AND SETTING COMPRESSOR AIR BLEED VALVE SCHEDULES

[75] Inventors: David J. Petro, Milford; Steven L. Battaini, Orange, both of Conn.

[73] Assignee: Avco Corporation, Stratford, Conn.

[21] Appl. No.: 651,886

[22] Filed: Sep. 19, 1984

[51] Int. Cl.[4] .............................................. F01B 25/00
[52] U.S. Cl. ..................................... 415/28; 415/118; 60/39.29
[58] Field of Search ...................... 415/28, 118, 26, 27; 60/39.27, 39.29; 116/273, 264; 73/744, 146.8

[56] References Cited

U.S. PATENT DOCUMENTS

| 979,516 | 12/1910 | Küppers | 116/273 |
|---|---|---|---|
| 1,227,842 | 5/1917 | Sellin | 116/273 |
| 2,732,125 | 1/1956 | Ruby | 60/39.29 |
| 2,881,617 | 4/1959 | Deis | 73/744 |
| 2,958,457 | 11/1960 | Fox et al. | 60/39.29 |
| 2,993,640 | 7/1961 | Moreillon | 415/26 |
| 3,263,403 | 8/1966 | Ladusaw | 116/273 |
| 3,487,993 | 1/1970 | Rannenberg | 60/39.29 |
| 3,583,218 | 6/1971 | Van Nostrand, Sr. | 116/273 |
| 3,849,020 | 11/1974 | Eastman | 60/39.27 |
| 3,918,254 | 11/1975 | Wernberg | 60/39.281 |
| 4,149,371 | 4/1979 | Spraker et al. | 60/39.29 |
| 4,186,556 | 2/1980 | Lowry et al. | 60/39.27 |
| 4,373,528 | 2/1983 | Harle | 116/272 |

FOREIGN PATENT DOCUMENTS 582991 12/1946 United Kingdom ............... 116/273

Primary Examiner—Louis J. Casaregola
Assistant Examiner—Donald E. Stout
Attorney, Agent, or Firm—R. D. Gelling

[57] ABSTRACT

A device is provided for indicating a fluid pressure and flow reversal. The device comprises a float tube in which a float is slideably disposed. An accumulator is disposed in communication with the float tube. The float tube is further in communication with a fluid pressure line. Pressure and flow reversals in the pressure line cause a noticeable movement of the float within the float tube.

8 Claims, 6 Drawing Figures

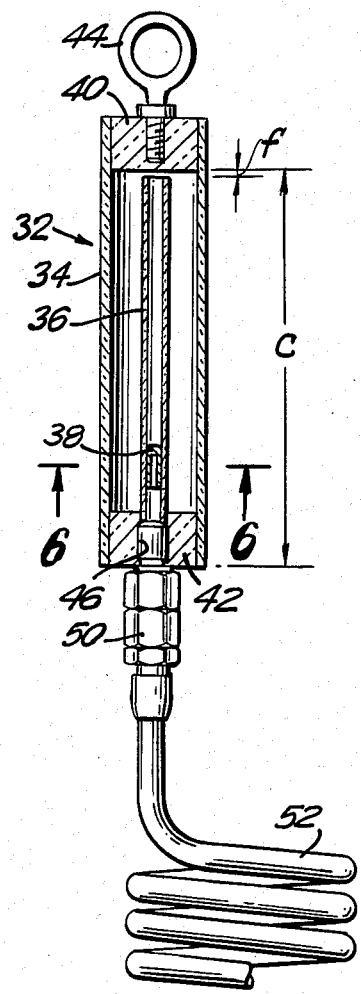
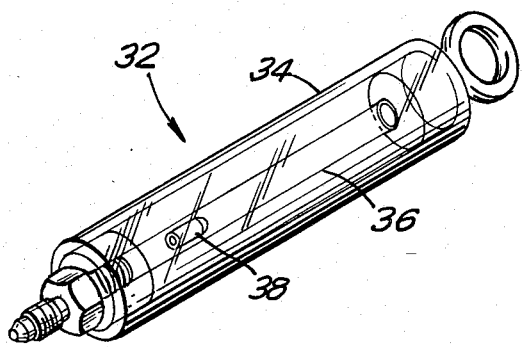
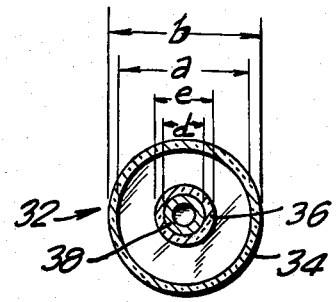
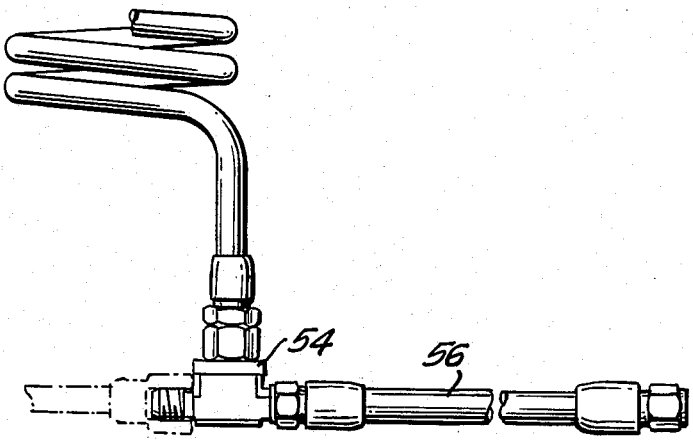
FIG.4
FIG.6
FIG.5

APPARATUS METHOD FOR CALIBRATING AND SETTING COMPRESSOR AIR BLEED VALVE SCHEDULES

BACKGROUND OF THE INVENTION

The compressor of a turbine engine is located in advance of the combustor and the multi-stage turbine assembly. The compressor functions to incrementally compress air and to move the air longitudinally through the compressor and into the combustor. A metered amount of fuel also is directed into the combustor, and is burned with the compressed air. The resultant energy transfer creates high velocity gas flow which is directed to the multi-stage turbine assembly. The turbine assembly, in turn, drives the compressor of the turbine engine and also produces the required power or thrust for the aircraft or other vehicle in which the engine is installed.

The compressor typically includes alternating arrays of rotating and stationary vanes which are arranged in stages along the longitudinal axis of rotation of the compressor. The rotating member in each stage functions to both compress the air and to advance the air longitudinally to the next successive stage. The stationary arrays of vanes, or radial impellers, function to guide the air into the next rotating array at the proper angle.

The compressor typically includes a plurality of bleed valves which are programmed to release air from the compressor at the onset of operating conditions that might otherwise result in a compressor instability referred to as surge or stall. For example, it is important for the bleed valve to be closed when the engine is operating at rated power or thrust. However, during other operating conditions such as certain ranges of acceleration, deceleration and other low pressure operations, the compressor bleed valves are opened to release air from the compressor, thereby avoiding compressor instabilities.

The specific conditions under which the bleed valve is opened, closed, or modulating therebetween typically are controlled by the transient air bleed actuator which senses certain engine operating characteristics, such as core compressor speed and fuel flow parameters. The specific conditions at which the bleed valve should open and close vary from engine to engine. Typically it is necessary to conduct bench tests on each engine to determine and calibrate the precise setting of the transient air bleed actuator. Precise setting of the transient air bleed actuator is critical in that a closed setting that is too low results in the probability of engine surge. On the other hand an open setting that is too high may prevent the engine from making power under certain operating conditions.

After the turbine engine is accurately set by bench testing with sophisticated equipment, the engine then is installed in the aircraft or other vehicle. Frequently this installation is carried out at a location far removed from the place of manufacture of the engine. The structure in which the engine is mounted frequently will have a significant installation effect on the aerodynamic performance of the engine. As a result, it invariably is necessary to reset either the transient air bleed actuator or the various engine parameter affecting the operation of the compressor bleed valve. For example, the fuel control schedule may be adjusted in the field to match the actual operation of the compressor bleed valves on the installed engine. This resetting or recalibration can have a very important effect on the ability of the engine to perform properly in actual use.

The ability to precisely reset the engine after it has been installed is dependent upon the ability to accurately determine the point at which the compressor bleed valves just begin to open. In the past, procedures for establishing the open and closed positions of the air bleed actuator have been imprecise. For example, ground crew personnel have tried to rely upon engine sound to determine the desired steady state bleed open and closed points. Specifically, the operator would slowly decrease the throttle levers in the cockpit and mechanics would try to listen for the initial escape of air from the air bleed valves. Other personnel have relied upon the cockpit instrumentation. Thus, for example, on a turbofan engine, during a slow, steady state deceleration the operator of the engine would closely observe the relationship between core speed and fan speed. As the core speed decreases, the bleed starts to open and the fan speed begins to decrease at a faster rate. Still others would listen for engine vibrations to determine the just beginning to open point.

These known methods for setting or calibrating the transient air bleed actuator have been extremely undesireable. For example, the audible signals from the engine could be interpreted differently by each individual operator. Furthermore, since all engines are different in some respects, similar audible signals given by two engines could actually reflect quite different operating conditions. Similarly, tests which rely upon cockpit instrumentation have been unreliable since the cockpit instruments are not calibrated to detect the specific operating points which correspond to bleed open or bleed closed conditions.

Consideration had been given to constructing instrument dials that could precisely measure selected engine operating parameters, and that could accurately identify the conditions corresponding to bleed open or bleed closed. However, the instruments and dials required to identify the specific operating points would be extremely large and expensive. Furthermore, most of the information relayed by these large expensive instruments would be largely irrelevant since it would be only a single point on the dial that would be of interest.

Simple pneumatic devices which measure pressure levels have been developed. Such devices are shown in: U.S. Pat. No. 2,706,463 which issued to Dunn; U.S. Pat. No. 3,024,655 which issued to Dwyer et al; U.S. Pat. No. 3,208,425 which issued to Jousma et al; and U.S. Pat. No. 4,169,386 which issued to McMahan. Although these devices can be manufactured inexpensively, they generally suffer from the same drawbacks as the pressure measuring dials. Specifically the known devices provide an approximate indication of pressure level, but are not able to accurately indicate a small pressure change or reversal. Furthermore they have not been considered for use with turbine engines.

Accordingly it is an object of the subject invention to provide an apparatus for calibrating or setting the compressor air bleed valve schedule.

It is another object of the subject invention to provide an apparatus for precisely identifying the engine operating conditions at which the air bleed valves just begin to open.

It is a further object of the subject invention to provide an apparatus that can be used in calibrating the fuel control schedule to reflect actual operation of the compressor bleed valves.

It is still another object of the subject invention to provide an apparatus for identifying changes or reversals in pressure, and flow, including small pressure changes in system accomodating high pressure levels.

It is still a further object of the subject invention to provide an apparatus that can be constructed inexpensively, that is sturdy and that can be used under a variety of conditions.

SUMMARY OF THE INVENTION

The subject invention is directed to an apparatus for identifying a change in pressure, and particularly a pressure change or flow reversal which occurs in the transient air bleed actuator at the instant the bleed valve begins to open. More particularly it has been found that pressure in the transient air bleed actuator tends to decrease with decreasing compressor speed. Thus, as a pilot undergoes a steady state deceleration both the core compressor speed and the pressure in the air bleed actuator tend to decrease. However at one point during this gradual decrease in core compressor speed, the pressure and flow in the air bleed actuator undergoes a sudden reversal and increases for a period corresponding to an approximately three or four percent decrease in core compressor speed within a one to two second interval. After this sudden increase, the pressure in the transient air bleed actuator proceeds to decrease at generally the same rate it had before. This aberation in the rate of change of pressure is caused by a transfer of controlling authority from $P_m$, which is an intermediate pressure inside the air bleed actuator, to $P_3$ pressure, which is the compressor discharge pressure. A more detailed explanation of this pressure and flow reversal is presented below. However it is sufficient to note here that the pressure reversal is an accurate indication of the precise point where the bleed valve begins to open.

In view of this pressure change or flow reversal phenomena, it was determined that a device which could accurately identify the instant of pressure reversal could be used to calibrate the bleed valve actuator. It was found, however, that measuring instruments, gauges and the like that would indicate pressure levels across the wide range of pressures involved were extremely expensive. Furthermore, it was found that the magnitude of the pressure change or reversal is small and of short duration when considered in view of the overall pressure level. Therefore many pressure measuring instruments would not accurately identify the relatively small pressure change or reversal.

The apparatus of the subject invention is a pressure and flow reversal indicator rather than a pressure level measuring device. More specifically the apparatus is operative to identify a pressure reversal of virtually any magnitude in environments of virtually any underlying pressure rate. The apparatus comprises a float mounted in sliding relationship within a pressure tube which in turn is mounted in communication with an accumulator volume. Both the pressure tube and the accumulator preferably are formed from transparent materials so that the movement of the float therein can be easily observed. However, in certain embodiments movement of the float can be electronically detected rather than visually observed, in which case transparency of the float tube and accumulator is not essential.

The pressure change or flow reversal indicator is mounted in communication with the $P_m$ pressure line between the air bleed actuator and the engine fuel control unit. Typically the communication between the subject indicator apparatus and the $P_m$ pressure line is carried out by a standard T-connection in the $P_m$ pressure line and a tubular connection between the "T" and the subject indicator. After the subject indicator has been installed, the initial normal operation of the engine will cause the float to move to the top of the float tube. However, the float will gradually settle all the way down to the bottom of the float tube, thereby reflecting the fact that the pressure is fairly stable and that the pressure on each side of the float is essentially equal. When the small pressure and flow reversal occurs, however, the pressures on either side of the float suddenly become unequal and the float rapidly moves to the upper end of the float tube. After a brief period the pressure on opposed sides of the float again stabilizes and the float gradually begins to settle to the lower end of the float tube. This abrupt upward movement of the float followed by the gradual settling of the float clearly identifies the just beginning to open point of the bleed valve actuator.

BRIEF DESCRIPTION OF THE DRAWINGS

FIG. 4 is a perspective view of the pressure reversal indicator of the subject invention.

FIG. 5 is a cross-sectional view of the pressure reversal indicator of the subject invention with attachments for connecting to the air bleed actuator.

FIG. 6 is a cross-sectional view taken along line 6—6 in FIG. 5.

DETAILED DESCRIPTION OF THE PREFERRED EMBODIMENTS

The compressor of an aircraft turbine engine typically is provided with a plurality of compressor bleed valves which are operative to release air from the engine in order to prevent an unstable operating condition referred to as surge or stall. The compressor bleed valves are programmed to open and close as a function of engine fuel flow, compressor discharge pressure and certain other engine operating characteristics. The complex parameter typically used to identify operating conditions for opening or closing the compressor bleed valve commonly is referred to as a fuel control ratio unit.

Figure 1:
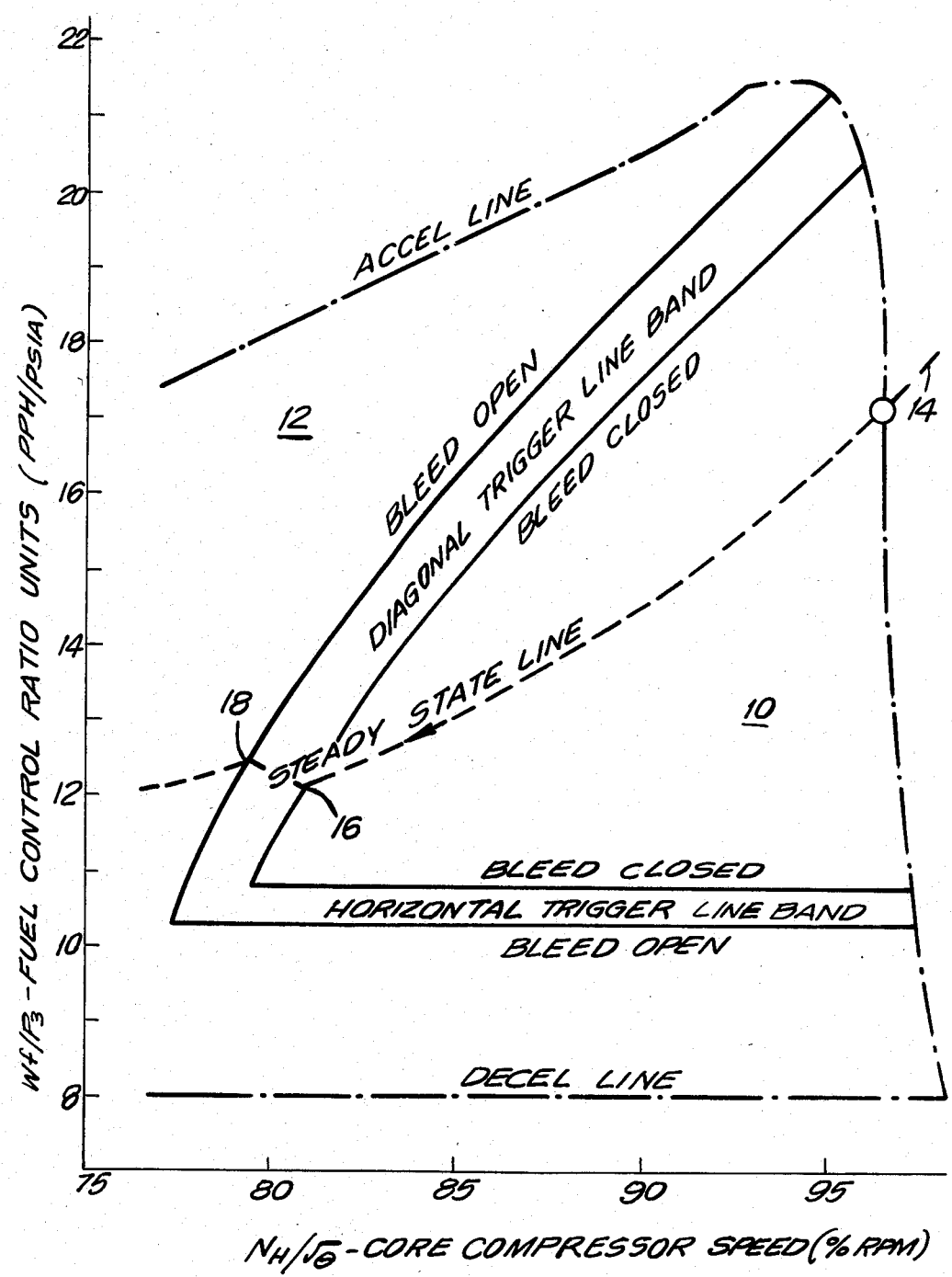
FIG. 1 is a graph of the relationship between fuel control ratio units and corrected core compressor speed for a prior art engine.

A representative graph showing the compressor bleed valve operation for a typical engine is illustrated in FIG. 1. More particularly FIG. 1 depicts the bleed valve disposition for various conditions of fuel control ratio units (wf/P$_3$) and core compressor speed (N$_H$). The generally triangular shaped area 10 in the central portion of FIG. 1 defines operating conditions during which the bleed valve is closed. The bleed closed area 10 will generally correspond to conditions where it is necessary for the turbine engine to make power. The two longitudinal areas identified as the diagonal trigger line band and the horizontal trigger line band in FIG. 1 identify the operating conditions during which the air bleed valve is modulating between a fully closed and a fully opened condition. The remainder of the graph shown in FIG. 1 is identified by the numeral 12 and corresponds to operating conditions during which the bleed valve is in a fully opened condition.

Line 14 is identified as the steady state line and identifies the range of engine operating conditions during a steady state acceleration or deceleration. When the engine is in a steady state deceleration, as indicated by the arrow on steady state line 14, both the core compressor speed and the fuel control ratio units decrease. When the core compressor speed decreases to approximately 81%, as indicated by point 16 on the steady state line 14, the bleed valve on the compressor begins to modulate into its opened condition. This modulation of the bleed valve extends across a range of approximately 3% to 4% of core compressor speed. At point 18 on the steady state line 14, the bleed valve is completely open and remains open throughout the remainder of the steady state deceleration. A similar, but reverse, modulation of the bleed valve occurs during acceleration. More particularly, during a steady state acceleration the bleed valve will gradually begin to close at point 18, and will reach its completely closed condition at point 16 thereby enabling the engine to make power.

Figure 2:
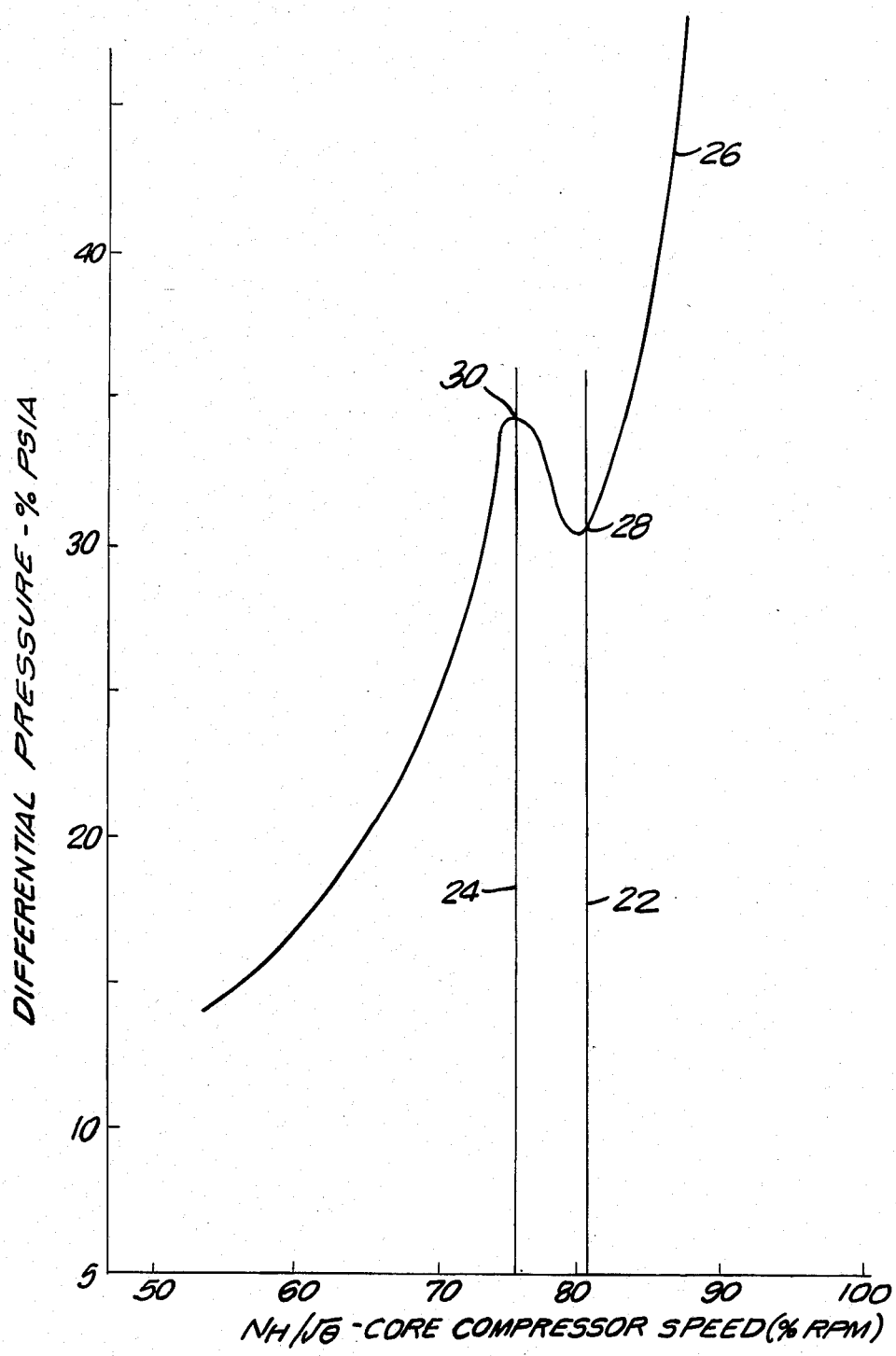
FIG. 2 is a graph showing the relationship between differential pressure in the air bleed actuator and the core compressor speed.

FIG. 2 shows the relationship between core compressor speed ($N_H$) and air bleed actuator differential pressure. The vertical line 22 indicates the just beginning to open point of the bleed valve. The vertical line 24, identifies the opposite extreme of the bleed valve modulation at which the bleed is fully open.

Line 26 on FIG. 2 represents the difference between the compressor discharge pressure ($P_3$) and the air bleed actuator signal pressure ($P_m$). Briefly, this differential pressure tends to decrease with decreasing core compressor speed. However, at the point 28 on line 26, which corresponds to the approximate core compressor speed at which the bleed valve just begins to open, the differential pressure indicated by line 26 actually begins to increase. This increase lasts for a period equalling approximately 3% to 4% of the slow decrease in core compressor speed. In the typical engine, this period of increasing differential pressure along line 26 will last for approximately 1 to 2 seconds. At point 30 on line 26, the differential pressure again reverses and continues its steady state descent as a function of decreasing core compressor speed.

Figure 3:
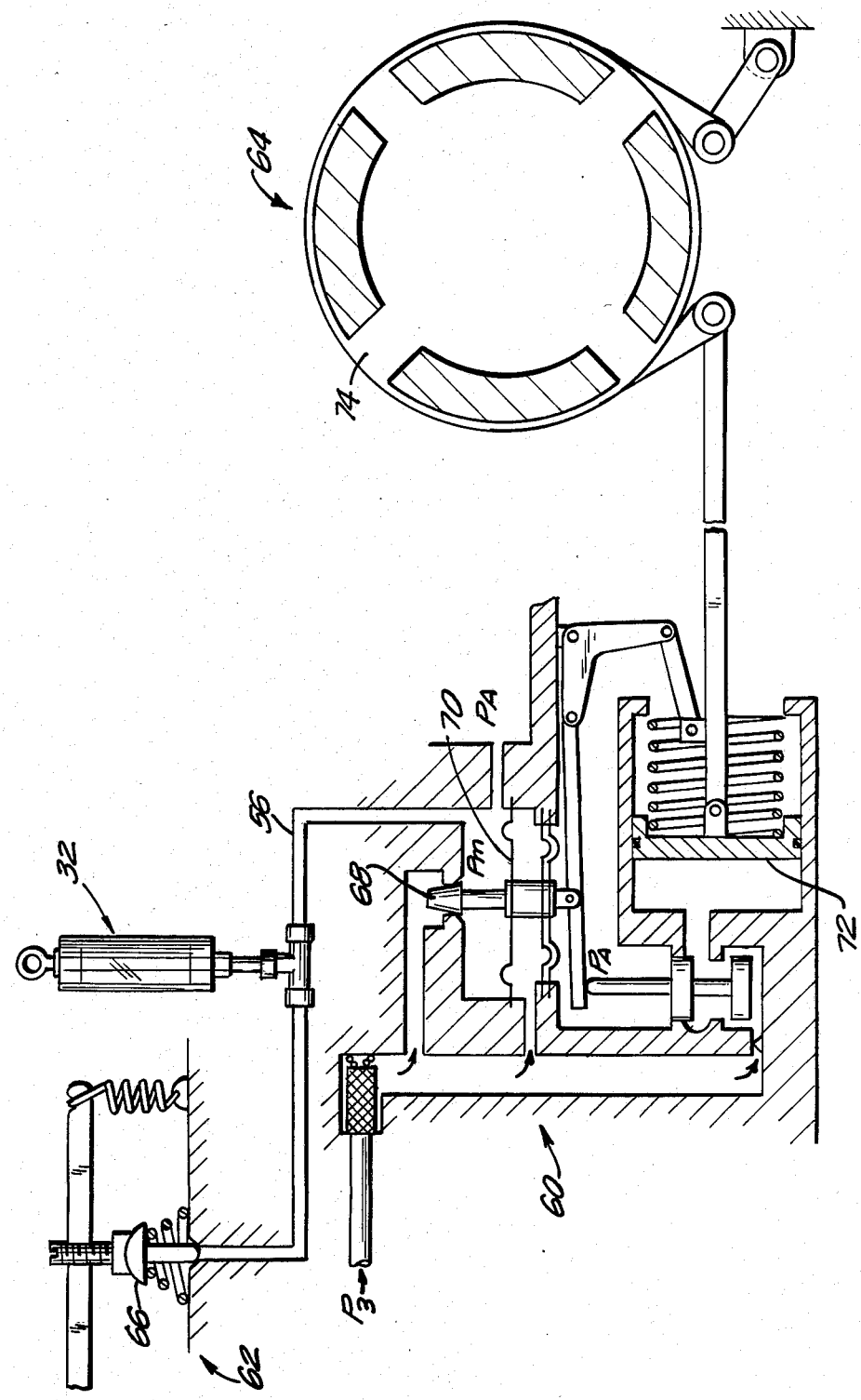
FIG. 3 is a schematic representation of the subject pressure reversal indicator incorporated into an air bleed actuator.

The reason for the pressure reversal indicated on FIG. 2 can be described briefly with reference to FIG. 3. As noted above, FIG. 3 provides a schematic illustration of the air bleed actuator 60 and associated parts of the fuel control mechanism 62 and the compressor 64. The fuel control mechanism 62 is in communication with the air bleed actuator 60 through the $P_m$ signal pressure line 56. More particularly, the fuel control mechanism 62 includes a poppet valve 66, the operation of which is a function of many complex variables including fuel control ratio units, corrected pressure, speed, altitude and such. When the poppet valve 66 on the fuel control mechanism 62 opens, in response to these parameters, a bleeding off of the $P_m$ pressure occurs through line 56.

The air bleed actuator 60 includes a $P_m$ modulating valve 68 which is in communication with the $P_m$ signal pressure line 56. The operation of the $P_m$ modulating valve 68 is a function of the $P_m$ pressure level, atmospheric pressure $P_a$, and the compressor discharge pressure $P_3$. Components of $P_3$ will operate on both sides of the $P_m$ modulating valve 68 and the diaphragm assembly 70. Just prior to the opening of the poppet valve 66, the $P_m$ modulating valve 68 will be in the minimum flow area condition illustrated in FIG. 3. However, after the initial opening of the poppet valve 66, and the initial bleeding off of $P_m$ pressure through line 56, the component of $P_3$ acting on the force balance relationship of the diaphragm assembly 70 will cause an opening of the $P_m$ modulating valve 68 and a resulting decrease in pressure in line 56. A second component of $P_3$ also acts on the end of the $P_m$ modulating valve 68. This second component of $P_3$ tends to cause the $P_m$ modulating valve 68 to close very shortly after it had opened. As a result the pressure in line 56 will initially increase and then reverse and begin decreasing again. This brief aberration is indicated graphically in FIG. 2 as the portion of line 26 extending from points 28 to 30. Although not central to the subject invention, it is the combined action of $P_m$, $P_3$ and $P_a$ which causes the movement of piston 72 and thereby operates the bleed valves 74 on the compressor case 64.

The apparatus of the subject invention is indicated generally by the numeral 32 in FIGS. 3 through 6. The apparatus 32 is adapted to be placed in communication with the $P_m$ pressure line 56, as illustrated in FIG. 3, and is operative to clearly indicate the above described pressure and flow changes in the $P_m$ pressure line 56.

The apparatus comprises a generally cylindrical accumulator tube 34 and a cylindrical float tube 36. The accumulator tube 34 and the float tube 36 are both formed from transparent materials. Although any transparent material theoretically is available for use in the accumulator and float tubes 34 and 36, it is important that the material selected be able to withstand the pressures typically encountered in the environment in which the apparatus 32 is used. For example, it has been found that in an aircraft turbine engine, where pressures in the range of 200 psia may be encountered a standard plexiglass is not of acceptable strength. Rather, in these high pressure environments a transparent polycarbonate has proved to be more desirable. As illustrated most clearly in FIGS. 4 and 6, the float tube 36 is located concentrically within the accumulator tube 34. Although this concentric arrangement is not essential to the functioning of the apparatus 32 it has been found to provide a clear visual indication.

Float 38 is slideably disposed within the float tube 36. The float 38 preferably is formed from a nontransparent material that can be readily observed as it moves longitudinally within the float tube 36. In the preferred embodiment the float 38 is formed from an initially transparent pellet of polycarbonate material. This pellet is hollowed out and the inner surfaces are dyed with a color that would be quite noticeable within the environment in which the apparatus 32 is used.

The apparatus 32 further includes opposed top and bottom end plugs 40 and 42. The top and bottom end plugs 40 and 42 are fixedly secured within the accumulator tube 34 adjacent the opposed ends thereof. This attachment of the top and bottom end plugs 40 and 42 must be sufficiently strong to withstand the pressures, and to prevent the escape of air from the apparatus 32.

The top end plug 40 is provided with an eye-hook 44 by which the apparatus 32 may conveniently be suspended during its use. The eye-hook 44 can be threadably or adhesively secured to the top end plug 40.

The bottom end plug 42 includes a central aperture 46 into which the float tube 36 is slideably inserted and secured. An adaptor 50 also is securely affixed to the aperture 46 in the bottom end plug 42. The adaptor is constructed to mount with a hose or tubing 52.

The dimensions of the various members from with the apparatus 32 is formed are dependent upon the environment and the desired sensitivity. For example, the thicknesses of the various members and the bond strengths therebetween would depend largely upon the pressure levels with which the apparatus 32 is used. Similarly, the clearances between the float 38 and the float tube 36 as well as the volume between the float tube 36 and the accumulator tube 34 would determine the magnitude of pressure reversal or change required to trigger a response from the apparatus 32.

For purposes of an example, and with reference to the figures, the following dimensions have been found acceptable for use with aircraft turbine engines in which pressures in the range of 175 psia to 200 psia are common, and where a pressure reversal or change of from 2% to 4% is to be sensed. Specifically, with reference to FIG. 6 the accumulator tube 34 is formed from a Merlon polycarbonate with an inside diameter of 1.250 inches and an outside diameter of 1.50 inches, as indicated by dimensions "a" and "b" respectively. The length of the accumulator tube 34 is 6.25 inches as indicated by dimension "c" in FIG. 5. The float tube 36 has an inside diameter of 0.272 inches and an outside diameter of 0.370 inches as indicated by dimensions "d" and "e". The float 38 has an outside diameter of approximately 0.265 inches. As a result, there is a radial clearance of approximately 0.0035 inches between the float 38 and float tube 36. As noted above, the size of this clearance can be varied for the desired sensitivity. Specifically, for greater sensitivity the clearance can be decreased, while for less sensitivity the clearance can be made greater.

The float tube 36 is of a length sufficient to provide a small gap between the end of the float tube 36 and the top end plug 40. This gap must be small enough to ensure that the float 38 will never be entirely removed from the float tube 36. A gap of 0.062 inches as indicated by dimension "f" in FIG. 5 has been found desirable.

With reference to FIGS. 3 and 5, when the poppet valve 66 is closed and the compressor bleed valves 74 are closed the $P_m$ pressure in the line 56 will be essentially constant. During these conditions, the pressure on both sides of float 38 are essentially equal. This equalized pressure reflects the fact that a small gap exists between the float 38 and the float tube 36. Consequently the pressure within the accumulator tube 34 will be essentially equal to $P_m$. However, when the above described pressure reversal takes place the pressure level in line 56 increases for a brief period of time, reflecting the momentary opening of the $P_m$ modulating valve 68. This short but noticeable increase in pressure in line 56 causes a rapid and very noticeable movement in float 38. Specifically, the float 38 will move rapidly to the end of float tube 36 adjacent to the top end plug 40. As the pressure level in line 56 stabilizes, the float 38 will gradually settle to the portion of float tube 36 adjacent the bottom end plug 42. The sequence of operation is described in the table below for a slow, steady state deceleration of a typical aircraft gas turbine engine.

| CORE COMPRESSOR SPEED (% RPM) | COMPRESSOR BLEED VALVES (74) | FUEL CONTROL POPPET VALVE (66) | FLOAT STATUS (38) |
|---|---|---|---|
| 1. More than 82% | fully closed | fully closed | down |
| 2. 82% | fully closed | slightly off seat | slightly bouncing up and down |
| 3. 81% | just beginning to open | .003" off seat | moves upwards in tube very quickly then slowly settles down |
| 4. 80% | partly open | .010" off seat | down |
| 5. 78% | fully open | fully open | down |

The sudden movement and rapid displacement of the float 38 described above and identified in line 3 of the preceding table readily can be observed, thereby enabling a proper and accurate resetting of the engine. With only minor adaptations that would be well within the means of the person skilled in this art, the movement of the float 38 can be detected electronically rather than visually. For example, appropriate electronic switch means can be positioned adjacent the upper end of the float tube 36 to be activated by the upward movement of the float 38.

Although the apparatus 32 has been described as a tool for accurately resetting certain engine parameters, the apparatus can also be used as a diagnostic tool for trouble shooting or identifying particular problems. For example, if the above described simple testing procedure does not result in a sudden upward movement of the float 38, there is a possibility that a problem may exist in either the compressor bleed valves 74 or in the air bleed actuator 62.

In summary, an apparatus is provided for detecting a change or reversal in flow or pressure. The apparatus comprises a float tube in which a float is slideably positioned. An accumulator is in communication with one end of the float tube, while the opposed end of the float tube is in communication with a pressure system. During conditions of steady or slowly changing pressure in the pressure system, the pressure on both sides of the float will be essentially equal. However, a sudden change in pressure in the pressure system, such as an increasing pressure reversal, will cause an abrupt movement of the float toward the end of the float tube in communication with the accumulator.

The subject invention has been described with respect to the operation of an aircraft turbine engine, however it must be appreciated that the apparatus described and illustrated can be used in any environment where it is necessary to identify a reversal of pressure. Furthermore, the device readily can be adapted to be used in systems which rely upon pressure reversals in liquid systems rather than gaseous systems.

While the preferred embodiment of the subject invention has been described and illustrated, it is obvious that various modifications can be made therein without departing from the spirit of the present invention which should be limited only by the scope of the appended claims.

What is claimed is:

1. A calibration and testing apparatus for use with a gas turbine engine, said engine including a compressor having at least one compressor bleed valve and an air bleed actuator which is operative to open or close the bleed valve on the compressor, said apparatus comprising:

a float tube having opposed first and second ends, said first end of said float tube being in communication with said air bleed actuator;

an accumulator having a single aperture therein, said second end of said float tube being in communication with the accumulator at said single aperture; and a float slidably disposed in said float tube, said float being dimensioned to permit controlled fluid communication between said air bleed actuator and said accumulator, said float being urged toward the first end of the float tube by a decrease in pressure in said air bleed actuator and being urged toward the second end of said float tube by an increase in pressure in said air bleed actuator, whereby said float will move from the first end of the tube to the second end thereof in response to pressure changes indicative of the initial opening of the bleed valve.

2. An apparatus as in claim 1 wherein said float tube and said float are generally cylindrical.

3. An apparatus as in claim 1 wherein said float tube is formed from a transparent material to enable visual observations of the movement of the float.

4. An apparatus as in claim 1 wherein said accumulator is of generally cylindrical configuration and is disposed concentrically about said float tube.

5. An apparatus as in claim 4 wherein said accumulator and said float tube are formed from a transparent material to enable observation of said float.

6. An apparatus as in claim 5 wherein said float tube and said accumulator are formed from polycarbonate.

7. An apparatus as in claim 5 wherein said accumulator includes opposed top and bottom end plugs fixedly attached to the opposed ends of said cylindrical accumulator, said top end being spaced from said float tube a sufficient distance to prevent removal of said float from said tube.

8. An apparatus as in claim 1 further including a hook means for enabling said apparatus to be suspended during use.

* * * * *